(No Model.) 3 Sheets—Sheet 1.

H. H. LAMONT.
THRESHING MACHINE.

No. 567,648. Patented Sept. 15, 1896.

Witnesses.
A. A. Baxter
Horace Ranlett

Inventor.
Hugh H. Lamont
by A. H. Ste Marie
atty.

(No Model.) 3 Sheets—Sheet 2.

H. H. LAMONT.
THRESHING MACHINE.

No. 567,648. Patented Sept. 15, 1896.

Witnesses.
A. A. Baxter
Horace D. Ranlett

Inventor.
Hugh H. Lamont
by A. H. Ste. Marie
atty

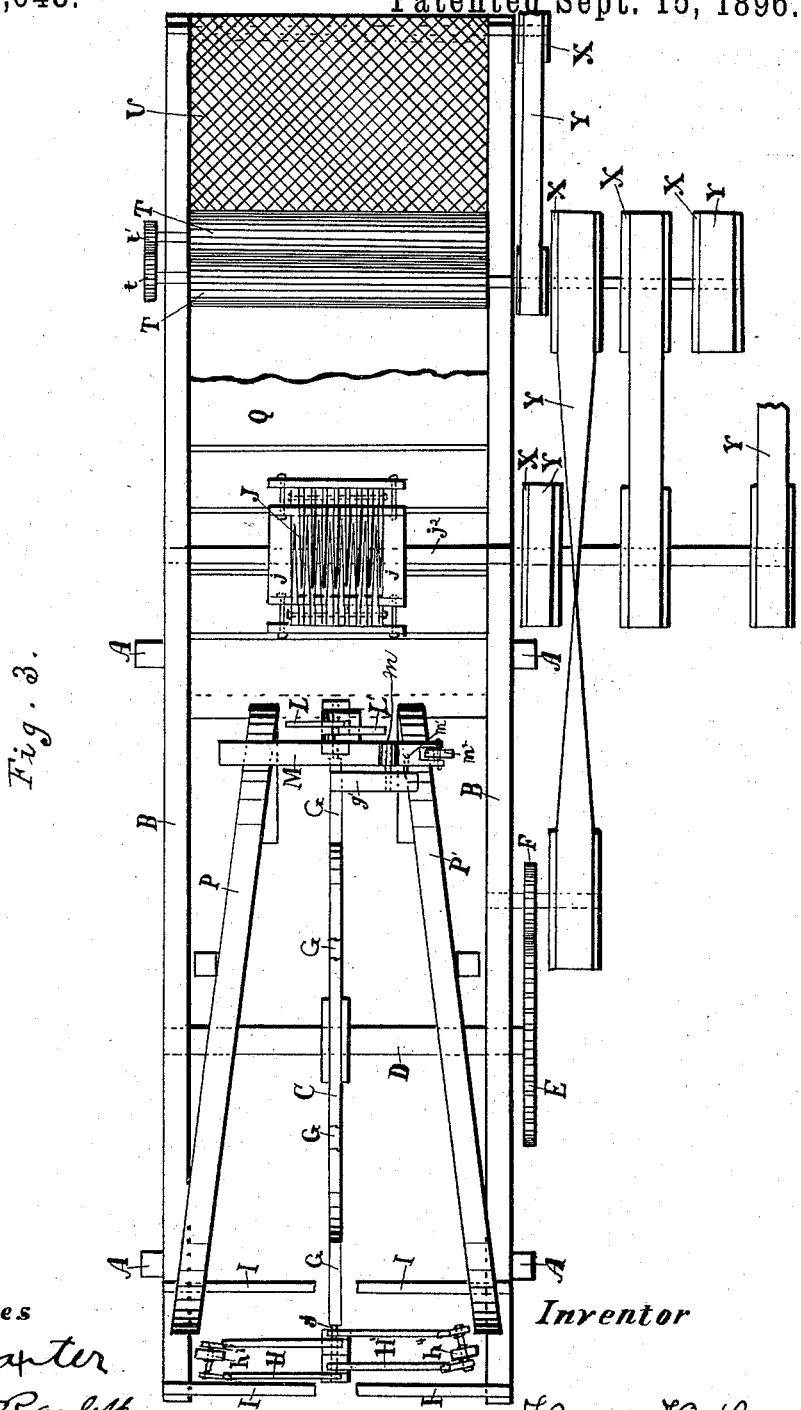

UNITED STATES PATENT OFFICE.

HUGH H. LAMONT, OF SAN FRANCISCO, CALIFORNIA.

THRESHING-MACHINE.

SPECIFICATION forming part of Letters Patent No. 567,648, dated September 15, 1896.

Application filed September 12, 1893. Renewed January 6, 1896. Serial No. 574,557. (No model.)

*To all whom it may concern:*

Be it known that I, HUGH H. LAMONT, a citizen of the United States, and a resident of the city and county of San Francisco, in the State of California, have invented certain new and useful Improvements in Threshing-Machines; and I do declare the following to be a full, clear, and exact description of the invention, such as will enable others skilled in the art to which it appertains to make and use the same, reference being had to the accompanying drawings, and to the letters thereon, which form a part of this specification.

This invention relates chiefly to improvements in machines for threshing flax, and the object thereof is to provide means whereby the seed may be removed from that plant without breaking the straw, and therefore without injury to the fiber.

For many years the United States has had over a million acres of land sown in flax that has been raised only for the seed, the straw being looked upon as a waste product, owing to the crude method still followed of threshing with spiked cylinders, which deliver the straw in a tangled and broken condition, and consequently render the fiber unfit for spinning purposes. The loss to the country arising from this mode of handling the flax crop amounts to millions of dollars yearly and should be averted, and to that end I have for years been experimenting both in the workshop and on the field with the view of devising means to remove the seed from flax quickly and thoroughly and yet have fiber fit for textile use. I have long seen the solution of the problem lay in being able to retain the flax in the bundle, as dropped from the binder, during the operation of threshing, that is, uncut, while it is stripped of seed-bolls and seed. Finally I have succeeded in producing a thresher that will do this, one that threshes and sacks the seed clean and rapidly, while it retains the bundles uncut, compact, and straight, delivering them ready for stacking or to be submitted to the usual preparatory process which flax undergoes when the fiber is wanted for spinning.

Figure 1:
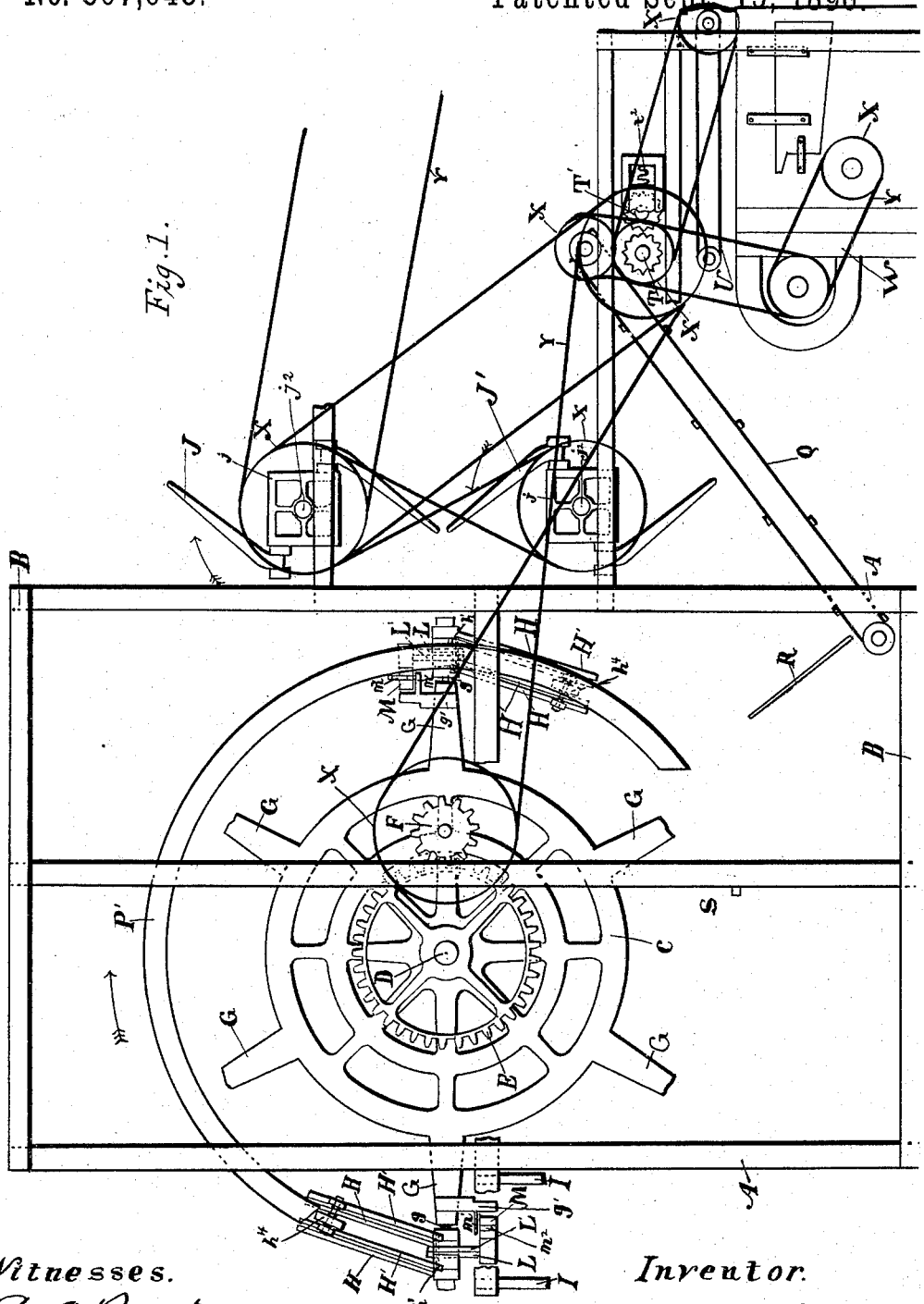
Figure 2:
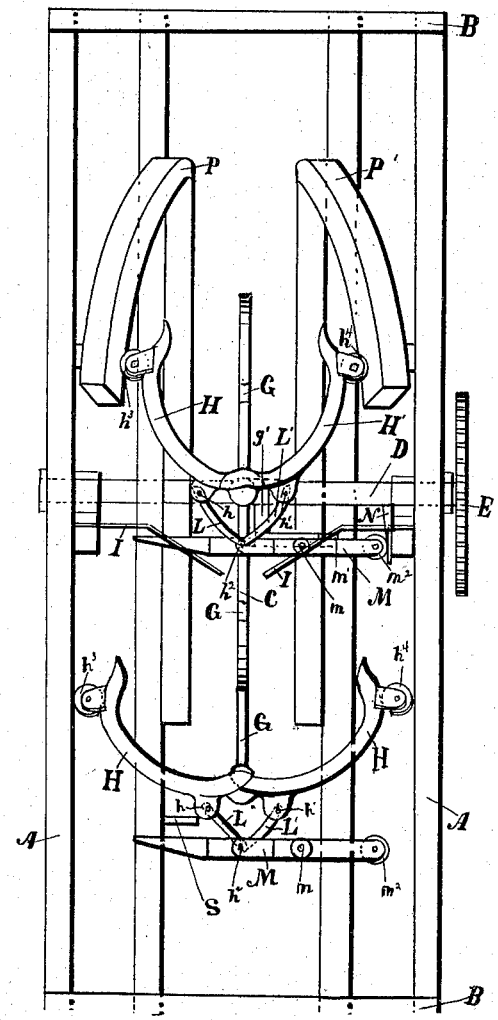

Referring to the accompanying drawings for a detailed description of my invention, Figure 1 is a side elevation of my improved thresher. Fig. 2 is a front view. Fig. 3 is a plan.

Corresponding letters of reference are used to designate corresponding parts throughout the various figures.

The framework of the machine is composed of the upright scantlings A and the beams B, and is suitably inclosed with boards (not shown) to keep the threshed material within bounds during the process of threshing.

In the front part of the framework is mounted a circular disk C upon a shaft D, rotated by a cog-wheel E, pinion F, and the usual power connections. The disk C has outwardly-projecting arms G, each of which is provided with a holder composed of double movable curved jaws H H', adapted to pick up, grasp, compress, and carry away bundles of flax placed upon a feed board or table I in front of the machine to beaters J J', located back of the disk.

The holders are pivotally connected at right angles to the arms G, the jaws being supported by and moving about a pin $g$, projecting from the end thereof. Besides the pivot-pin $g$ the jaws are also provided with other pins $h$ $h'$ in their lower portion, to which are connected the upper ends of links L L', whose lower ends carry a horizontal lever M upon a common pivot $h^2$. The fulcrum of the lever M is at $m$, where it is pivotally connected with a bracket $g'$, secured to one side of the arm that carries the holder, below which the lever is suspended. A stop $m'$ outwardly projecting from the bracket $g'$ prevents that end of the lever which is at the right of the fulcrum from being unduly raised, while an end roller $m^2$, adapted to come in contact with and ride upon a substantially vertical but slightly-inclined track N, allows the same end of the lever to be pressed down to a limited extent. The effect of the track N upon the roller $m^2$ is to cause the lever to suddenly and quickly throw up the links connected with it and partially close the jaws around a bundle as soon as taken up from the feed-board, so the bundles may not slide out and down at this point, which they would be likely to do, owing to the fact that their heavier part, the head carrying the seed, has to be placed outward, were no provision made to properly grasp or seize them. The jaws are fully closed around and made to compress or tightly squeeze the bundles by means of a circular or semicircular track composed of metal-lined timbers P P', which are set by the sides of the disk C. These timbers are convergent toward the rear and placed so that rollers $h^3 h^4$, secured to the tips or upper ends of the jaws, may come in contact with and ride upon their inner sides immediately after being thrown up by the lever M, as above described. The rollers $h^3 h^4$ having to follow the curves of the track, the jaws are gradually brought together until the bundle which they embrace is made quite compact, when it is in proper condition to be submitted to the action of the beaters.

J J', the beaters referred to, consist of two sets of blades rigidly secured to boxes $j$, that are keyed to and revolve upon shafts $j^2$. These are placed one above the other and are turned in opposite directions, as indicated by the arrows, the upper one moving in the same direction as the disk and the lower one oppositely thereto. Thus the upper beater is made to strike the bundles brought by the holders, that is, the heads thereof, from under, whereas the lower one strikes them from above. This is thought to be the most practical arrangement. In coming in contact with the heads of the bundles the blades whip off or beat out the seeds and seed-bolls and the straw remains practically intact, the seed falling upon a conveyer-belt Q behind a dashboard R, and the straw being brought farther to the front, where it is dropped by the holders. The jaws are opened to release the bundles by means of an arm or a bar S, which projects inwardly from the frame and is placed so as to strike the left end of the levers M on their passage outward.

The seed and seed-bolls are carried up by the conveyer Q to a pair of corrugated rollers T T', which are mounted in suitable boxes and suitably covered. These rollers are set close to each other, so as to thoroughly crush the seed-bolls that have not been broken by the beaters and remove the seed therefrom. Differential gears $t\ t'$ are used in connection with the rollers T T' in order to produce a rubbing or drawing action upon the seed-bolls while crushing them and thus free the seed more readily. A sliding bearing pressed by a spring $t^2$ is also provided for one of the rollers to allow it to move away from the other in case a stone, a piece of wood, or some other hard object should pass between them.

From the corrugated rollers the matter removed from the bundles, that is, the seed, the crushed seed-bolls, and the refuse, fall onto an open-mesh endless belt U, running above a winnower or fanning-mill W. What is not carried away by the belt U drops into the fanning-mill, where it is treated in the usual manner.

The various parts of the above-described threshing-machine may be put into motion or operated in several ways, but by preference I use pulleys X and belts Y, arranged as shown in Figs. 1 and 3 and driven from any suitable motor located at the rear end of the machine.

The inner or opposing faces of the holding-jaws are concave, so that they may encircle and compress the bundles and retain them in a compact form, delivering them in exactly the same condition in which they are received, minus the seed. In a former application for patent filed April 18, 1893, Serial No. 470,908, I have shown and described holders of a concave formation, but I make no claim in that application to anything disclosed and claimed in this application.

What I claim, and desire to secure by Letters Patent of the United States, is—

1. In a machine for threshing bundled flax and in combination, a movable concave bundle-holder adapted to close to retain and compress the bundle and to open to release said bundle, and rotating blades or beaters arranged relatively to the bundle-holder, so as to pass through the head of the bundle in the holder, substantially as described.

2. In a machine for threshing bundled flax, the combination with a rotating disk provided with bundle-carriers having concave opening and closing jaws to release, retain and compress the bundles, of a rotary beater-head having separate blades arranged in line, said beater-head being placed relatively to the disk so that the blades pass through the heads of the bundles, substantially as described.

3. In a machine for threshing bundled flax, the combination with a movable bundle-carrier, having concave jaws to retain, compress and release the bundle, of a rotary beater having blades so arranged as to be presented edgewise to and pass edgewise through the head of the bundle in the bundle-carrier, substantially as described.

4. In a machine for threshing bundled flax, a rotating bundle-carrier having concave opening and closing jaws, in combination with a rotating beater having blades relatively to the bundle-carrier, so that such blades pass edgewise through and among the stems composing said bundle, substantially as set forth.

5. The combination of a rotary disk, jaws pivoted together on the edge of said disk, links pivoted to the lower sides of the jaws and having their lower ends pivoted together, a lever pivoted to the lower ends of the links and fulcrumed on a bracket projecting laterally from the disk, a stop to limit the upward movement of the outer end of said lever and an inclined track to depress the same, substantially as described.

6. In a flax-threshing machine, the combination with a bundle holder and carrier consisting of jaws pivoted together, of converging tracks on opposite sides of the path of said jaws adapted to compress the same around the bundle substantially as described.

7. The combination of the jaws pivoted together, links pivoted to the lower sides of the jaws and having their lower ends pivoted together, a lever fulcrumed at one side of the links and pivoted to the lower ends of the links, and means for depressing the outer end of said lever, substantially as described.

In testimony whereof I affix my signature in presence of two witnesses.

HUGH H. LAMONT. [L. S.]

Witnesses:
HORACE D. RANLETT,
A. H. STE. MARIE.